United States Patent [19]

Guittet et al.

[11] Patent Number: 4,510,574
[45] Date of Patent: Apr. 9, 1985

[54] SERVOSYSTEM BETWEEN A MASTER ACTUATOR AND A SLAVE ACTUATOR

[75] Inventors: Jack Guittet, Les Ulis; Paul Marchal, Gif sur Yvette; Alain Micaelli, Arcueil; Jean Vertut, Issy-les Moulineaux, all of France

[73] Assignee: Commissariat a l'Energie Atomique, Paris, France

[21] Appl. No.: 410,556

[22] Filed: Aug. 23, 1982

[30] Foreign Application Priority Data

Sep. 9, 1981 [FR] France .................... 81 17103

[51] Int. Cl.³ .............. G08C 19/00; G05B 11/00; G05D 3/00; B25J 3/04
[52] U.S. Cl. .................................. 364/513; 318/628; 414/5; 414/909; 901/2; 901/9; 901/50
[58] Field of Search .................... 364/513; 318/628; 414/1, 4, 5, 909; 901/2, 4, 9, 50

[56] References Cited

U.S. PATENT DOCUMENTS

| | | | |
|---|---|---|---|
| 2,861,699 | 11/1958 | Youmans | 364/513 X |
| 3,241,687 | 3/1966 | Orloff | 414/5 |
| 3,414,136 | 12/1968 | Moore et al. | 414/5 |
| 3,923,166 | 12/1975 | Fletcher et al. | 901/2 X |
| 4,046,262 | 9/1977 | Vykukal et al. | 414/5 |
| 4,056,763 | 11/1977 | Debrie et al. | 318/628 X |
| 4,367,532 | 1/1983 | Crum et al. | 318/628 X |

OTHER PUBLICATIONS

European Search Report, 0077224.

Primary Examiner—Jerry Smith
Assistant Examiner—Allen MacDonald
Attorney, Agent, or Firm—Oblon, Fisher, Spivak, McClelland & Maier

[57] ABSTRACT

A force return servosystem between a master actuator and a slave actuator connected by transmission lines, which introduce a delay, $\tau$.

At the master actuator, the servocontrol is realized by means of two devices supplying force signals, where the smaller is applied to the master actuator, but having the polarity of the signal supplied by a first servocontrol device. The latter compares, in a known manner the position signal $\theta(t)$ of the master actuator with the delay position signal $\theta'(t-\tau)$ of the slave actuator, whereas a second servocontrol device compares the delayed position signal $\theta(t-2\tau)$ with signal $\theta'(t-\tau)$.

The invention may be used in manipulators, the control of the flying of a missile and any other control requiring the proportioning of the force controlling a movement of a machine.

6 Claims, 7 Drawing Figures

SERVOSYSTEM BETWEEN A MASTER ACTUATOR AND A SLAVE ACTUATOR

BACKGROUND OF THE INVENTION

The present invention relates to a servosystem between a master actuator and a slave actuator. Each of these actuators transmits to a control device of the other actuator a position and/or speed signal, whereby this takes place with a certain transmission delay. Although such a system can be applied to the manual control of the remote flying of a missile or to any control requiring the proportioning of the force exerted and its return to the hand of the operator, it is more particulalry suitable for the control of each of the movements of a manipulator.

So-called "force return master-slave manipulators" generally comprise a master arm, a slave arm identical or similar to the master arm and a servosystem connecting the two arms. The effect of this servosystem is that the slave arm can carry out identical or homothetic movements to those performed by the master arm and conversely the master arm can be made to follow in an identical or homothetic manner all the displacements of the slave arm. When one of the two arms encounters resistance during its displacement, the other arm encounters an equal or proportional resistance to the first-mentioned arm. Such a force return servosystem gives the control of the manipulator a completely spontaneous character and gives the user the impression of directly holding the object in his hand.

The manipulators used generally have at least six degrees of freedom, i.e. the master arm and the slave arm able to carry out at least six independent movements. Each movement of the master arm and each corresponding movement of the slave arm are carried out by independent actuators, which are interconnected in pairs of independent servosystems, the geometry of both the master arm and the slave arm recombining the different movements when a complex movement is formed.

The actuators of the force return master-slave manipulators can be electrical or hydraulic. In the most frequently encountered case of electrical actuators, which are then geared motors, importance is attached to the reduction gear being reversible and having only negligible friction, so that a master actuator is electrically connected to its corresponding slave actuator. Hydraulic actuators have a much more limited application and usually involve the manipulation of loads which are many times the force received or exerted by the operator.

No matter what type of actuator is used in the force return master-slave manipulators, two different servocontrol methods can be used.

The first of these methods, called "position-position servocontrol" consists of making the position of the slave arm follow the master arm and simultaneously making the position of the master arm follow the slave arm. This method has the obvious advantage of leading to a perfect symmetry of the servosystem. The information relating to the displacement speeds of the different parts of the master and slave arms, which are also necessary for the stability of the servosystem, can be locally processed with respect to the master or slave actuators or can be transmitted between the master and slave actuators at the same time as the arm position data. This method generally requires the reversibility of the actuators, because the device does not normally have the force transducer.

The second servocontrol method, which is called "position-force servocontrol" or "force-position servocontrol", consists of making the master arm exert the same forces as the slave arm, whilst making the slave arm occupy the same position as the master arm or vice versa. This method is obviously characterized by an asymmetry of the servosystem. In particular, the transmission carries the position information in one direction and the force information in the other direction.

The differences between the servosystems used on the force return master-slave manipulators lead to different reactions between systems, when a varyingly long delay is introduced in one of the transmission lines connecting the master arm to the slave arm in both directions.

Thus, on introducing a delay longer than 100 milliseconds into a position-position servosystem, the latter has an instability which it is possible to correct without significantly reducing the static gain of the servo control. Conversely, on wishing to carry out a displacement, the effect of the delay is to introduce a viscous friction proportional to the said delay, as well as to the displacement speed. When this delay reaches $\frac{1}{2}$ or 1 second, the viscous friction is well above the normal displacement forces and is not really acceptable. Position-force servosystems do not have this effect, but instead have a more difficultly compensatable instability. Thus, research carried out on this type of servocontrol has revealed that it was necessary to considerably reduce the gains in order to provide a relatively stable device, when a delay of 500 to 1000 milliseconds is introduced into the transmission of the signals. Under these conditions, the force return control mode becomes virtually unusable.

If it is found that the existence of a delay in the transmission of the servosystem it is relatively frequent, it is clear that these disadvantages of the known servosystems are particularly prejudicial and it is desirable to eliminate them. This is in particular the case in servosystems using a sample of the transmitted signals. Thus, this sampling introduces a delay equal to the duration of the sampling in the transmission of the signals. This is also the case during a transmission of data over a long distance and/or in a liquid medium and particularly between a satellite and an earth station or between a submarine and a surface vessel. The intrinsic delay due to the transmission delay can then reach values between 500 and 1000 milliseconds.

BRIEF SUMMARY OF THE INVENTION

The present invention relates to a force return servosystem of the position-position type which makes it possible, when there is a delay in the transmission of signals, to ensure a correct restoration of the force return, i.e. substantially without viscous friction.

The present invention therefore proposes a servosystem between a master actuator and a slave actuator, each of the said actuators transmitting to a control device of the other actuator a position and/or speed signal with a transmission delay, each control device comparing the delayed signal from the other actuator with the signal from the actuator which it controls, in order to supply a first force signal, wherein at least on the side of the master actuator, means for delaying the signal from the master actuator by the sum of the transmission delays is positioned upstream of the control device in such a way that the latter compares the delayed signal from the slave actuator with the signal from the master actuator delayed by said means, in order to supply the first force signal.

Such a servosystem remains a position-position servocontrol because the transmitted signals are position and/or speed signals. With regards to the force signals controlling the actuators, everything takes place as if the system were of the position-force type, which makes it possible to eliminate viscous friction. In addition, compared with position-force servosystems, the servosystem according to the invention has advantages linked with the transmission of position and/or speed signals, among which reference can be made to greater simplicity of the detection devices associated with the actuators.

When the delay becomes excessive, the stability of the servosystem according to the invention tends to decrease, and, according to a preferred embodiment of this system, it is proposed to make it comparable with that of prior art position-position servosystems by also providing on the master actuator side a second control device comparing the delayed signal from the slave actuator with the signal from the master actuator for supplying a second force signal, the first control device defining with the master actuator the same transfer function as the slave servocontrol device with the slave actuator, means for rectifying the first force signal and the second force signal, means for comparing the rectified force signals, means for choosing the smallest of these signals and means for allocating the polarity of the second force signal to the thus chosen signal before injecting it into the master actuator.

According to a preferred feature of the invention, this servosystem also comprises means for comparing the polarity of the second force signal with that of a speed signal from the master actuator and means for selecting the second force signal when the polarity of these signals is the same, no matter what the signal supplied by the means for comparing the rectified force signals. In this case, the speed signal can either be supplied by a transducer associated with the master actuator, or can be supplied by means for deriving the master actuator position signal within the second control device of the latter.

According to another preferred feature of the invention, the servosystem is similar on the slave actuator side and the master actuator side.

The servosystem according to the invention can be used in the flying control of a missile or in a control requiring the proportioning of the force of any movement of a machine. However, it is preferably applied to a manipulator, which comprises a servosystem in accordance with the invention.

BRIEF DESCRIPTION OF THE DRAWINGS

The invention is described in greater detail hereinafter relative to non-limitative embodiments and with reference to the attached drawings, wherein show:

FIG. 4b a variant of the system of FIG. 4a.

DETAILED DESCRIPTION OF THE PREFERRED EMBODIMENTS

Figure 1:
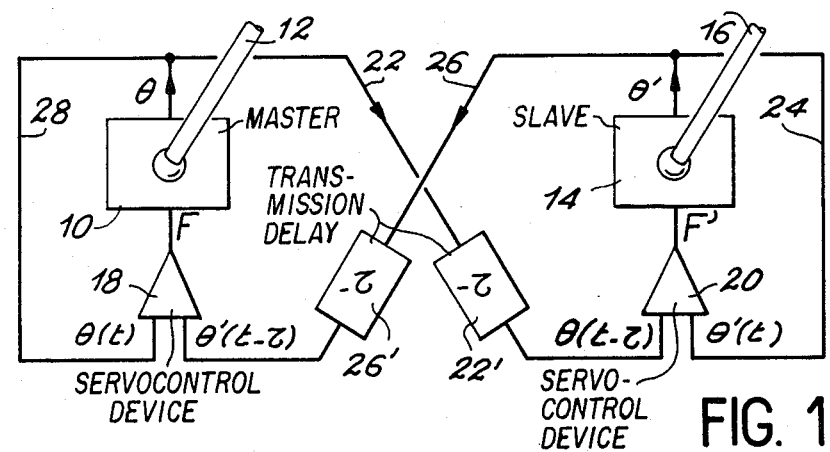
FIG. 1 diagrammatically a prior art force return position-position servosystem.

FIG. 1 diagrammatically shows a position-position force return servosystem making it possible to control the servocontrol of one of the movements of the master arm and of the slave arm of a manipulator according to the prior art. Obviously a comparable servosystem is provided for each of the individual movements of the manipulator, these movements being combined together in the master arm and in the slave arm.

More specifically the servosystem of FIG. 1 comprises on the master side a master actuator 10, provided with a movable lever 12, to which a force can be applied. A slave actuator 14 provided with a lever 16 identical or similar to lever 12 is provided on the slave side to correspond with actuator 10. It should be noted that actuators 10 and 14 can be identical or homothetic. In the latter case the reproduction by lever 16 of the movement controlled by lever 12 is homothetic on the geometrical plane. There can also be a proportionality with respect to the forces if the torque capacity of actuator 14 is a multiple of that of actuator 10.

The object of the servosystem of FIG. 1 is that when the operator actuates lever 12, lever 16 performs the same movement or a proportional movement. Moreover, any force encountered in its movement by lever 16 must be manually restored to lever 12 by the operator and conversely if lever 16 is driven by a force from outside the system, lever 12 must also be driven with a force equal or proportional to the said force.

For this purpose the servosystem of FIG. 1 comprises a servocontrol device 18 associated with the master actuator 10 and a servocontrol device 20 associated with slave actuator 14. A position datum or signal $\theta$ supplied by a not shown position transducer associated with the master actuator 10, is transmitted by a transmission line 22 to control device 20 of slave actuator 14 and said device compares signal $\theta$ with a position datum or signal $\theta'$ supplied by a not shown position transducer associated with slave actuator 14. Signal $\theta'$ reaches device 20 by a line 24. As a function of the results of this comparison, device 20 supplies a force signal F' controlling slave actuator 14.

In the same way position signal $\theta'$ returns from the master part to control device 18 via a line 26 for comparison in device 18 with signal $\theta$ reaching it by line 28. As a function of the results of this comparison, device 18 supplies a force signal F, which controls the master actuator 10.

Actuators 10 and 14 supply proportional forces. Thus, devices 18 and 20 are substantially identical and their differences can e.g. be based on the correcting networks and in general terms the difference between the transfer functions of said devices. In exemplified manner control devices 18 and 20 can be realized in accordance with French Pat. No. 74 21 355 (equivalent to U.S. Pat. No. 4,056,763).

The conventional servosystem described hereinbefore with reference to FIG. 1 represents a total symmetry between the master and slave parts, both from the mechanical standpoint and from the actual servosystem standpoint. Each of the servocontrol devices 18, 20 compares position θ, θ in order to supply a force proportional to the corresponding error signal. Thus, if actuators 10 and 14 are electrical, signals F and F' supplied by devices 18 and/or 20 are signals controlling the current, whereas these signals control the pressure if actuators 10 and/or 14 are hydraulic.

On assuming that the value of signal θ' is below that of signal θ, signal F exerts a force opposite to that of θ on actuator 10. Conversely signal F' supplied by device 20 exerts a force in the same direction as force θ' on slave actuator 14. Thus, devices 18 and 20 operate in the opposite direction. In other words the servocontrol device 20 exerts an active torque on slave actuator 14, whereas device 18 exerts a resistant torque on master actuator 10. Obviously if the value of θ' exceeds that of θ, the system reacts in the same way, after inverting all the signs of the angles.

As is shown by the arrows in FIG. 1, the servosystem described hereinbefore is characterized by the transition of a position signal in one or other direction between the master part and the slave part by means of lines 22 and 26. As stated hereinbefore, this transmission of signals between the master and slave parts can, in certain cases, be accompanied by a transmission delay $\tau$, shown in FIG. 1 in the form of two identical rectangles 22', 26' for lines 22, 26. For obvious physical reasons when there is such a transmission delay, it is almost always the same on line 22 as on line 26.

As stated hereinbefore, the position signal can be accomplished by a speed signal, or said position can be reconstituted from a single speed signal in accordance with French Pat. No. 74 21 356. Furthermore, this transmission delay can be due to two different reasons, which can possibly be summated. The first of these reasons is the processing means for the signals transmitted by lines 22 and 26. When the signals are sampled on these lines by means of multiplexers, of the type described in French Pat. No. 74 21 356, the signals are transmitted indirectly in the form of samples of signals representing the displacement speed with respect to the speed of the actuators, these signals then being integrated in order to reconstitute the corresponding position of the actuator. This leads to a constant delay in the signals having its origin in the duration of the repetition during sampling.

A second cause due to the transmission distance of the signals and/or the nature of the medium used for this transmission can replace or be added to the first cause of delay. This is in particular the case when lines 22 and 26 representing a long distance electromagnetic transmission, particularly between an earth station and a satellite, or when these lines represent a submarine ultrasonic transmission, particularly between a submarine and a surface vessel. In both cases the delay can be known in a precise manner and it can be considered that it varies between approximately half and two seconds.

The detrimental effect of this delay on the operation of the servosystem of FIG. 1 is all the greater, because with respect to each of the servocontrol devices 18 and 20, the outward transmission delay is added to the return transmission delay. Thus, at time t, device 18 of the master part compares signal $\theta(t)$ with signal $\theta'(t-\tau)$, whilst at the same time device 20 of the slave part compares signal $\theta(t-\tau)$ with signal $\theta'(t)$. In practice on exerting an action on lever 12 of master actuator 10 at time t, the signal θ representing this action has repercussions on the input of the servocontrol device 20 of slave actuator 14 with delay $\tau$ and the resulting effect on the slave actuator, represented by signal $\theta'(t+\tau)$ consequently returns to servocontrol device 18 of master actuator 10 in an overall delay of two $\tau$ after the initial action on lever 12. In the case where the outward and return delays are different ($\tau$ and $\tau'$), the overall delay is obviously $\tau + \tau'$.

Figure 2:
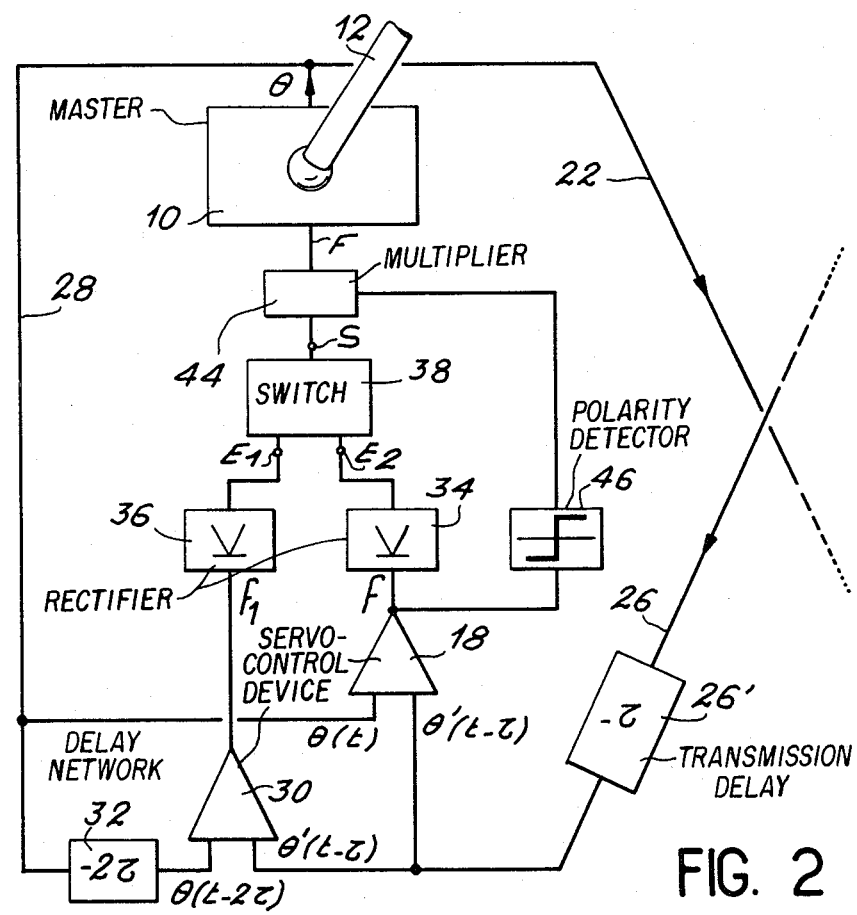
FIG. 2 the master part of the system of FIG. 1 into which have been introduced the characteristics of the present invention.

With reference to FIG. 2, a first embodiment of the servosystem according to the invention will now be described. This system obviates the disadvantages due to the delay in the position-position force return servosystem described hereinbefore with reference to FIG. 1.

It is firstly pointed out that FIG. 2 does not show the slave part of the servosystem, because in this first embodiment of the invention the slave part of the system is identical to that of the prior art systems described with reference to FIG. 1. The master part of the servosystem according to the invention comprises all the elements used in the prior art. Thus, in FIG. 2 it is possible to see the torque generating master actuator 10 and its lever 12. It is also possible to see transmission line 22 by which the position signal θ from actuator 10 is transmitted to the slave part of the system with delay $\tau$. Signal θ is also transmitted by line 28 to servocontrol device 18, which also receives with a delay $\tau$ represented by rectangle 26' the position θ' from the slave actuator via transmission line 26. As in the prior art system, device 18 compares signal $\theta(t)$ with signal $\theta'(t-\tau)$ at time t in order to supply a force signal f.

According to the invention, a second servocontrol device 30 is provided on the master side. Device 30 defines with actuator 10 a transfer function which is as close as possible to that defined by device 20, combined with actuator 14. It can in particular be identical to device 18 or 20. Device 30 receives the position signal θ provided by the master actuator 10, after the signal has passed through a delay network 32 delaying this signal by twice the transmission delay $\tau$ (or $\tau + \tau'$). Like device 18, device 30 also receives signal θ' from the slave part of the system, The servocontrol device 30 compares signal $\theta(t-2\tau)$ with signal $\theta'(t-\tau)$ at time t in order to supply a force signal $f_1$. Thus, the signals f and $f_1$ have the same variation amplitude.

Each of the force signals f and $f_1$ pass into rectifier means 34, 36 respectively and the two rectified signals are compared in a circuit 38, which selects the smaller of the two and supplies it to the output.

Figure 3:
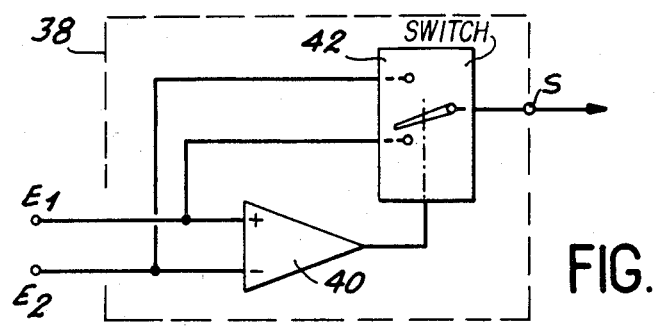
FIG. 3 a more detailed view of part of the servosystem of FIG. 2.

More specifically, it can be seen in FIG. 3 that the circuit 38 comprises an operational amplifier 40 functioning as a comparator and as an analog switch 42. The rectified signals injected at signals $E_1$ and $E_2$ of circuit 38 are passed on the one hand to the inputs of amplifier 40 and on the other hand to the inputs of switch 42. The latter is controlled by the signal supplied to the output of amplifier 40. This signal is a logic, 0 or 1 signal, depending on whether the difference is positive or negative. Thus, the signal transmitted to output S of circuit 38 is the smaller of the two signals injected at inputs $E_1$ and $E_2$.

Finally, it can be seen in FIG. 2 that the signal supplied at output S of circuit 38 is allocated the polarity of signal f by a circuit 44 controlled by a polarity detecting device 46 connected to the output of the servocontrol device 18. According to the invention, the polarized signal f from circuit 44 is applied to master actuator 10.

The system described hereinbefore can function in three different ways, as a function of the amplitude and polarity of signals f and $f_1$ supplied by servocontrol devices 18 and 30.

In a first case, it is assumed that the rectified signal f is smaller than the rectified signal $f_1$. Circuit 38 then supplies at its output rectified signal f and circuit 44 restores to the said signal, via device 46, the initial polarity of signal f. Signal F controlling the servocontrol of master actuator 10 is then identical to signal f and the operation of the system is the same as that of FIG. 1.

If it is now assumed that rectified signal $f_1$ is smaller than rectified signal f and that the signals f and $f_1$ have the same polarity, signal 38 supplies at its output S the rectified signal $f_1$ and circuit 44 restores the polarity of signal f to the said signal. Signal F is then identical to signal $f_1$ supplied by the second servocontrol device 30.

Finally, on assuming that the rectified signal $f_1$ is lower than the rectified signal f and that signals f and $f_1$ have an opposite polarity, everything takes place in the same way as in the preceding paragraph, but circuit 44 allocates to signal $f_1$ the polarity of signal f, in such a way that signal F controlling the master actuator 10 is the signal $f_1$ supplied by the servocontrol device 30, but whose polarity has been reversed.

On analyzing these three operating modes, it has already been pointed out in connection with the system of FIG. 1 that the first mode involving device 18 is characterized by a parasitic effect due to the total delay $2\tau$ (or $\tau + \tau'$). This effect is characterized by a resistance in the form of a viscous friction due to the fact that the slave arm is delayed compared with the master arm. If the movements take place at a constant speed, there will be a constant displacement between the slave arm and the master arm. If the speed increases, there is a proportional increase in the parasitic resistance. The same applies on increasing delay $2\tau$. However, this viscous friction also has a beneficial effect, because it helps to stabilize the system. Thus, this mode is advantageous when there is a low or zero speed.

The second and third operating modes of the system of FIG. 2 involve the servocontrol device 30. As has been shown hereinbefore at time t this device compares $\theta (t-2\tau)$ with signal $\theta' (t-\tau)$. This comparison can be compared with that performed by control device 20 of slave actuator 14 (FIG. 1), which compares $\theta (t-\tau)$ with $\theta (t)$. Thus, like device 20, device 30 compares with the slave position signal $\theta$ a master position signal $\theta$, which is delayed by the time $\tau$ compared with signal $\theta'$. In other words, device 30 carries out the same comparison as the slave servocontrol device 20 with a delay $\tau$. As in general the movement of the slave arm is not very fast compared with time $\tau$, it can be considered that the signal $f_1$ supplied by device 30 differs very little as compared with signal F' supplied by device 20.

If these various remarks are applied to the second embodiment of the system of FIG. 2 in which signal F injected into master actuator 10 is signal $f_1$, it can be considered that what has been injected into master actuator 10 is a signal corresponding to the signal which could have been sampled at the input of slave actuator 14 and reaching the master part of the system with transmission delay $\tau$. In this operating mode everything takes place as if there had been a position servocontrol of the master actuator towards the slave actuator and a fourth servocontrol of the slave actuator towards the master actuator. It has already been stated that this type of position-force servocontrol is not sensitive to the effect of the delay in the form of a viscous friction, because it supplies a true value of the force applied by slave actuator 14, accompanied by a delay. However, it is known that this type of servocontrol is more unstable than position-position servocontrols. However, it has better performance characteristics than the other system when the speed increases or when there is only a small delay.

The third operating mode of the system of FIG. 2 consisting of applying to master actuator 10 a signal F corresponding to the fourth signal $f_1$ supplied by device 30 but with a reverse polarity, in fact constitutes a variant of the second mode. The third mode has all the characteristics of a position-force servocontrol. It has been provided as a result of the need of ensuring in an optimum manner the continuity in the operation of the system. Thus, if only the two first-mentioned operating modes existed, the switching from one mode to another would lead to a sudden reversal of the direction of signal F controlling the master actuator 10 when signals f and $f_1$ have an opposite polarity. This is obviously undesirable and is the reason why in this third operating mode the reverse polarity is allocated to signal $f_1$, when signals $f_1$ and f have opposite polarities.

As a result of these three operating modes, the servosystem of FIG. 2 makes it possible to benefit from the respective advantages of position-position and position-force servocontrols, whilst ensuring the continuity of operation of the system. Thus, when the speed of the displacements of the arms of the manipulator is low or zero, position-position servocontrol has a better stability and viscous friction is negligible, because it is proportional to the speed. Signal f which, under these conditions is less than signal $f_1$, is then injected into master actuator 10 in accordance with the first mode described. When the speed increases, it is in fact the position-force servocontrol which is most advantageous. The rectified signal $f_1$ then becomes higher than rectified signal f and is injected with the polarity of the latter into master actuator 10 in accordance with the second and third modes. It should be noted that the systematic assignment of the sign of signal f to signal $f_1$ contributes to the stability of the servosystem, because it enables signal $f_1$ to benefit from the stability associated with signal f.

In the case where the delay $2\tau$ (or $\tau + \tau'$) is low (approximately 10 ms), which is in particular the case when signal sampling occurs, the circuit of FIG. 2 can be simplified in accordance with the present invention. To this end only device 30 and delay network 32 are retained on the master side, whereas device 18 and circuits 34, 36, 38, 44 and 46 are eliminated. The system then operates continuously in accordance with the second mode, which makes it possible to eliminate viscous friction, which reduces the maximum possible speed in the prior art position-position systems.

The system described hereinbefore with reference to FIG. 2 has a good stability and appropriate servocontrol gains. Moreover, it restores to the operator with delay $2\tau$ a force return applied by slave actuator 14 at lever 12 of master actuator 10. Bearing in mind the delay with regards to the force return, the system has a satisfactory behaviour with respect to a fixed obstacle. The same applies when carrying out a displacement in the opposite direction to a force e.g. on raising a load counter to gravity. However, the system behaves less satisfactorily on carrying out a displacement in the same direction as the force, e.g. on decelerating a load during its fall instead of raising. Everything takes place as if the manipulator was made to operate in reverse, i.e. as if the slave arm was actuated in order to move the master arm.

Figure 4A:
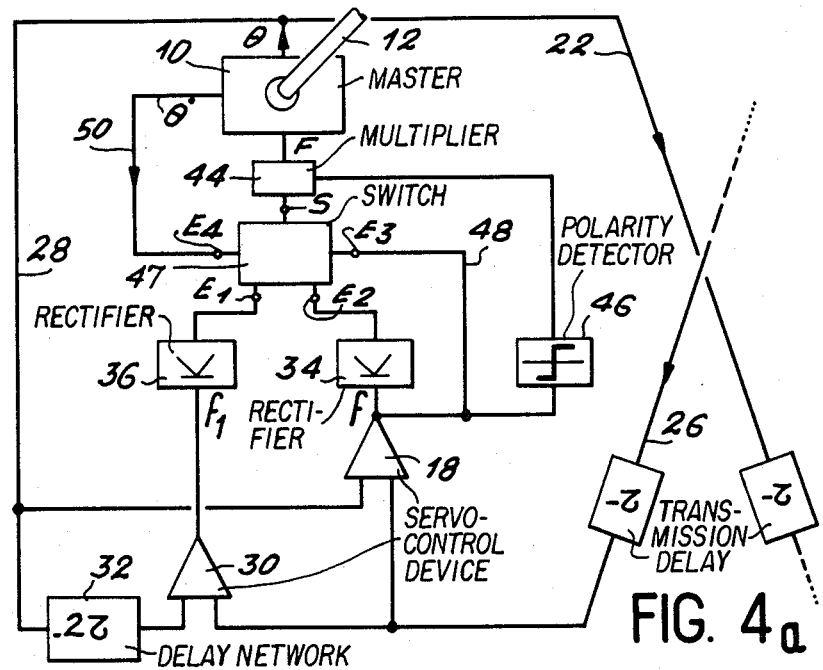
FIG. 4a a second embodiment of the invention constituting an improvement to the system of FIG. 2.

In order to obviate this disadvantage, FIG. 4a shows a second embodiment of the servosystem according to the invention. This consists of putting into practice the observation whereby in the case when the operator decelerates the load instead of raising it, the first operating mode of the device according to the invention is still preferable, because its defect of having a viscous friction is on this occasion favourable to the deceleration or braking of the load.

Figure 5:
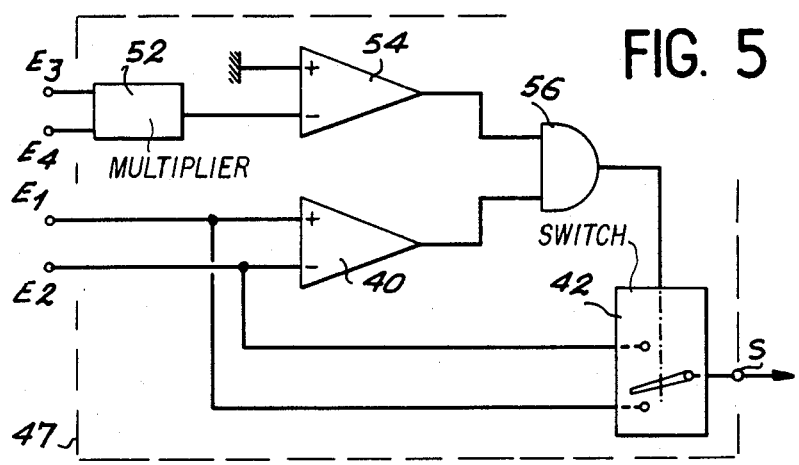
FIG. 5 a more detailed view of part of the systems of FIGS. 4a and 4b.

Thus, the system of FIG. 4a has all the elements of the system of FIG. 2, with the exception of circuit 38, which is replaced by a circuit 47 shown in greater detail in FIG. 5. The other elements of the system are designated by the same reference numerals and will not be described again.

As is shown in FIG. 5, circuit 47 comprises all the same elements as circuit 38 of the embodimen of FIG. 2. Thus, it is possible to see that the inputs $E_1$ and $E_2$ of circuit 47 are connected to an operatonal amplifier 40 operating as a comparator. In the same way, its inputs are connected to an analog switch 42, which transmits to the output S one or other of the signals $f_1$ and $f$, after said signals have been rectified in rectifiers 36 and 34.

Moreover, circuit 47 comprises two supplementary inputs $E_3$ and $E_4$, which respectively receive signal $f$ supplied by servocontrol device 18 and a signal $\theta'$ representing the displacement speed of actuator 10. Signal f is sampled at the output of device 18 and is forwarded by line 48 to input $E_3$. In the embodiment of FIG. 4a, actuator 10 incorporates a not shown tachiometric transducer making it possible to measure speed $\theta'$ and the latter is then passed to input $E_4$ of circuit 46 by a line 50. On again referring to FIG. 5, it can be seen that signals f and $\theta'$ respectively injected at inputs $E_3$ and $E_4$ of circuit 47 are introduced into a multiplication circuit 52, whose output is connected to one of the input terminals of a second operational amplifier 54 functioning as a phase comparator. The second input of amplifier 54 is connected to earth, in such a way that amplifier 54 supplies a logic 0 signal when signals f and $\theta'$ have the same polarity. The signals supplied by amplifiers 54 and 40 are injected into an AND-circuit 56, whose output controls switch 42.

In circuit 47 described hereinbefore, as soon as signals $\theta'$ and f have the same sign, switch 42 is controlled so as to connect input $E_2$ to output S. In other words, it is then the rectified signal f supplied by device 18 which will reach circuit 44, no matter what the result of the comparison performed by operational amplifier 40 between signals f and $f_1$. In this embodiment of FIG. 4a, circuit 47 makes it possible to systematically inject into master actuator 10, the signal f supplied by device 18 when the force represented by signal f is in the same direction as the displacement speed represented by signal $\theta'$. Conversely when signals f and $\theta'$ have opposite signs, operational amplifier 54 supplies a logic zero signal and circuit 47 functions in the same way as circuit 38 in the embodiment of FIG. 2.

Figure 4B:
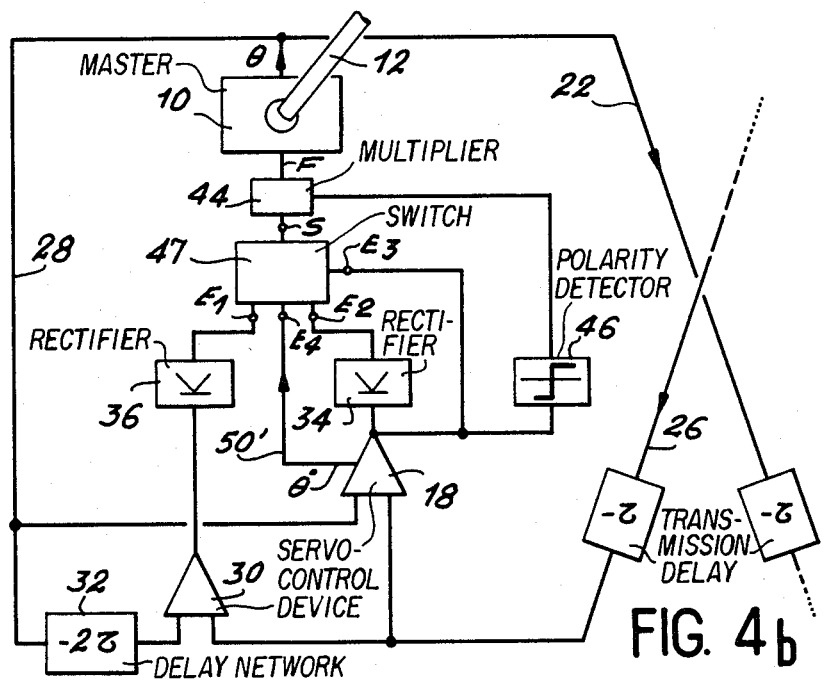

FIG. 4b shows a variant of the embodiment of FIG. 4a in which, instead of adding a tachiometric transducer to actuator 10 to give details of speed $\theta'$, said speed is calculated within the servocontrol device 18 by deriving signal $\theta'$. Line 50 of FIG. 4a connecting actuator 10 to input $E_4$ of circuit 47 is then replaced by a line 50' connecting device 18 to the input $E_4$ of circuit 47.

The embodiment described hereinbefore with reference to FIG. 4a, as well as the variant of FIG. 4b make it possible, in the manner shown hereinbefore, to automatically bring the operation of the servosystem according to the invention into the first operating mode corresponding to the operation of the prior art servosystems as represented in FIG. 1, when the slave arm drives the master arm in its movement. As a result it is possible to eliminate the disadvantages of the servosystem according to the invention when the latter operates in reverse, i.e. when the operator decelerates the load instead of actuating it.

Over and beyond the improvements described with reference to FIGS. 4a and 4b, the following remarks will show that the operation of the servosystem according to the invention can be further improved by providing the slave side of the system with the same improvements as the master side. This is diagrammatically shown in FIG. 6, where it is possible to see the master actuator 10, provided with its lever 12, as well as the slave actuator 14 provided with its lever 16 are both controlled by a servocontrol device 58, 60 in accordance with the embodiment of FIG. 2 or in accordance with FIGS. 4a or 4b. As in the embodiment of FIG. 1, the slave servocontrol device 60 receives the position signal $\theta$ via a line 22 defining a delay $\tau$ represented by the rectangle 22' and the position signal $\theta'$ via a line 24. In a symmetrical manner, the master servocontrol device 58 receives signal $\theta'$ by transmission line 26 defining a delay represented by rectangle 26', as well as signal $\theta$ by line 28. Each of the devices 58 and 60 according to the invention supplies, in response to these signals, an optimum control signal for F, F' respectively, controlling the master actuator 10 and slave actuator 14. As has been stated hereinbefore, actuators 10 and 14 can be identical or homothetic, whilst servocontrols 58 and 60 of the embodiment of FIG. 6 will be identical or similar as a function of the particular case.

Figure 6:
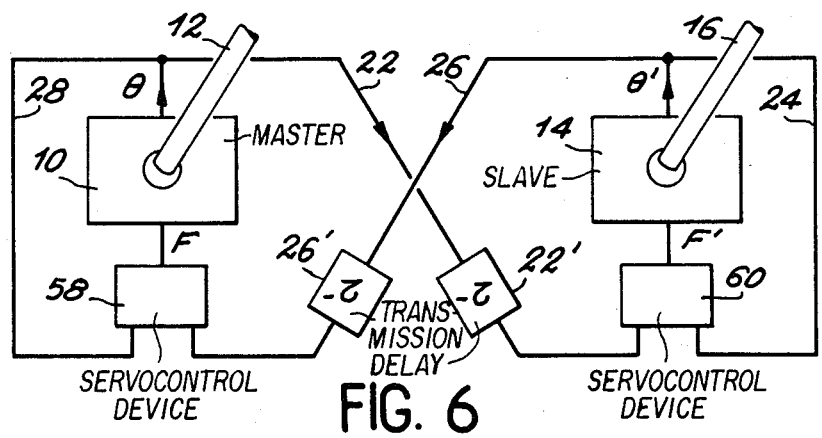
FIG. 6 diagrammatically another embodiment of the invention in which the master and slave parts of the servosystem are modified.

In the embodiment of FIG. 6, when the slave arm exerts an active force, i.e. when it drives the load, the slave arm exerts with respect to the operator a braking force making it possible to benefit from the improved operation of the servocontrol system described with reference to FIG. 2. The slave arm is then in the active working position, in such a way that the operating mode of the servocontrol 60 is the first mode corresponding to the prior art. However, on the master arm side, the operation is optimized by servocontrol 58 in accordance with the present invention. However, when the load drives the slave arm, the slave servocontrol 60 operates in accordance with the invention, whereas master servocontrol 58 is switched to the first operating mode in accordance with the prior art. Thus, no matter what the envisaged situation, the servocontrol system of FIG. 6 operates in both directions as a function of the most appropriate configuration of the invention, particularly when the servocontrol systems 58 and 60 are realized in accordance with FIGS. 4a and 4b.

Obviously the invention is not limited to the embodiments described and represented hereinbefore and numerous variants are possible thereto without passing beyond its scope. Thus, it is pointed out that a manipulator generally defines at least six degrees of freedom corresponding to six different movements, each of which is controlled by a different actuator, on both the master side and the slave side. Thus, a manipulator generally comprises at least six servosystems according to the invention, each of these being associated with a pair or master and slave actuators, corresponding to a given movement. Moreover, the servosystem according to the invention can also be applied to other controls and particularly to that of the flying of a missile or any control requiring the proportioning of the force controlling a movement of a machine.

What is claimed is:

1. A servosystem comprising:
   a master actuator;
   a slave actuator;
   a first control device associated with each of said master actuator and said slave actuator for controlling the associated actuator;
   each of said actuators having an output, said output being connected to a first input of the first control device associated with the other actuator through a first delay device and to a second input of the first control device associated with the actuator, each of said actuators producing a first signal at said output;
   each of said first control devices comparing the delayed first signal received at said first input and the first signal received at said second input and producing a first force signal in response thereto;
   a second delay device connected to the output of the master actuator for delaying the first signal by an amount equal to the sum of the delay amounts of the two first delay devices; and
   a second control device receiving and comparing said delayed first signal from said second delay device and said delayed first signal from said slave actuator for producing a second force signal in response thereto.

2. A servosystem according to claim 1, wherein said master actuator and associated first control device define an identical transfer function to said slave actuator and associated first control device, said servosystem further comprising:
   means for rectifying said first force signal from said first control device associated with said master actuator and said second force signal to produce a rectified first force signal and a rectified second force signal;
   means for comparing said rectified first force signal and said rectified second force signal to determine the smaller signal and connect said smaller signal to an output; and
   means for allocating polarity having an input connected to the output of said means for comparing for receiving said smaller signal and allocating the polarity of said second force signal to said smaller signal and producing an output signal.

3. A servosystem according to claim 2, wherein said master actuator produces a speed signal at a second output, said servosystem further comprising:
   means for comparing polarity connected to said second output of said master actuator and to said second control device for comparing the polarity of said second force signal with the polarity of said speed signal and producing an output signal;
   said means for comparing receiving said output signal of said means for comparing polarity and connecting said second force signal to an output when the polarity of said second force signal and said speed signal are the same regardless of the relative size of the rectified force signals.

4. A servosystem according to claim 3, wherein said master actuator includes a transducer for producing said speed signal.

5. A servosystem according to claim 2, wherein said first control device associated with said master actuator includes a means for producing a speed signal.

6. A servosystem according to claim 1, further comprising:
   another second delay device connected to the output of the slave actuator for delaying the first signal from said slave actuator by an amount equal to the sum of the delay amounts of the two first delay devices; and
   another second control device receiving and comparing said delayed first signal from said another second delay device and said delayed first signal from said slave actuator for producing another second force signal in response thereto.

* * * * *